(12) United States Patent
Klug

(10) Patent No.: US 6,702,970 B2
(45) Date of Patent: Mar. 9, 2004

(54) PROCESS TO REDUCE STICKING DURING SURFACE TREATMENT OF GRAPHITE ARTICLES

(75) Inventor: Jeremy H. Klug, Brunswick, OH (US)

(73) Assignee: Advanced Energy Technology Inc., Wilmington, DE (US)

(*) Notice: Subject to any disclaimer, the term of this patent is extended or adjusted under 35 U.S.C. 154(b) by 315 days.

(21) Appl. No.: 09/848,149

(22) Filed: May 3, 2001

(65) Prior Publication Data

US 2002/0131926 A1 Sep. 19, 2002

(51) Int. Cl.[7] .......................... B29C 33/58; B29C 53/04
(52) U.S. Cl. ...................... 264/166; 264/280; 264/284; 264/297.1; 264/316
(58) Field of Search ................................ 264/166, 280, 264/284, 297.1, 316

(56) References Cited

U.S. PATENT DOCUMENTS

| | | | |
|---|---|---|---|
| 3,157,723 A | * 11/1964 | Hochberg | ................... 264/284 |
| 3,404,061 A | 10/1968 | Shane et al. | |
| 4,895,713 A | 1/1990 | Greinke et al. | |
| 5,091,025 A | * 2/1992 | Murakami et al. | ...... 264/280 X |
| 5,902,762 A | 5/1999 | Mercuri et al. | |

OTHER PUBLICATIONS

International Publication No. WO 00/64808, International Publication Date Nov. 2, 2000, "Flexible Graphite Article And Method of Manufacture", UCAR Graph-Tech Inc.
FREKOTE® Products Brochure, 5 pp., Rev. 08/91.
GLAD® CLINGWRAP® material discussed in present application.

* cited by examiner

Primary Examiner—Leo B. Tentoni
(74) Attorney, Agent, or Firm—Waddey & Patterson, P.C.; James R. Cartiglia

(57) ABSTRACT

Processes and systems to reduce sticking of graphite materials and particularly resin impregnated graphite materials to forming tools, such as an embossing roller, during a process of manufacturing articles from the graphite materials. In one embodiment, an aerosol spray non-stick material is intermittently sprayed upon the embossing rollers. In a second embodiment, one or more sheets of thin flexible solid non-stick material, such as polyethylene, are sandwiched between the graphite material and the embossing rollers. The system is particularly useful for manufacturing material useful in producing components of fuel cells.

17 Claims, 1 Drawing Sheet

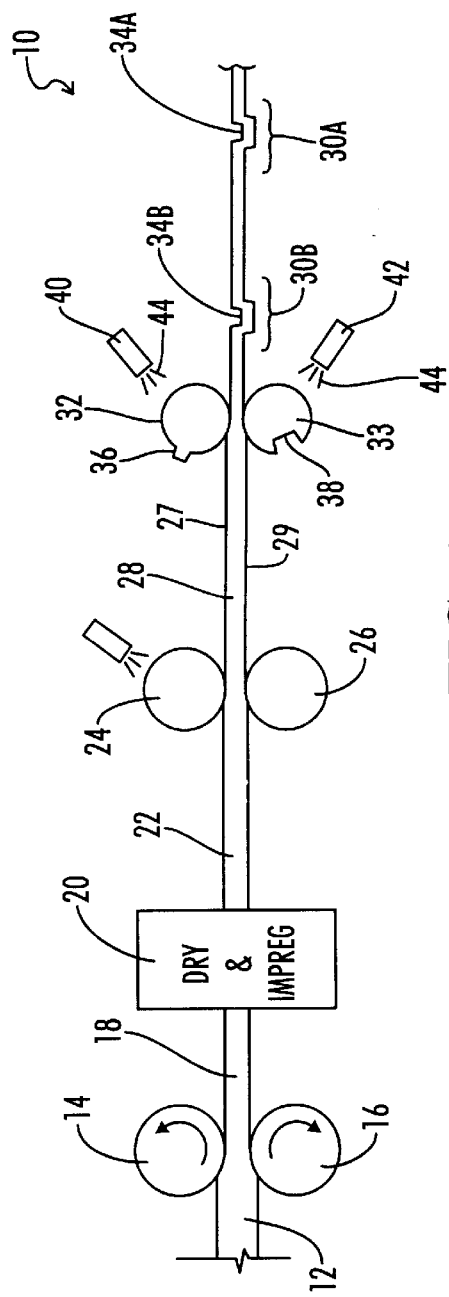
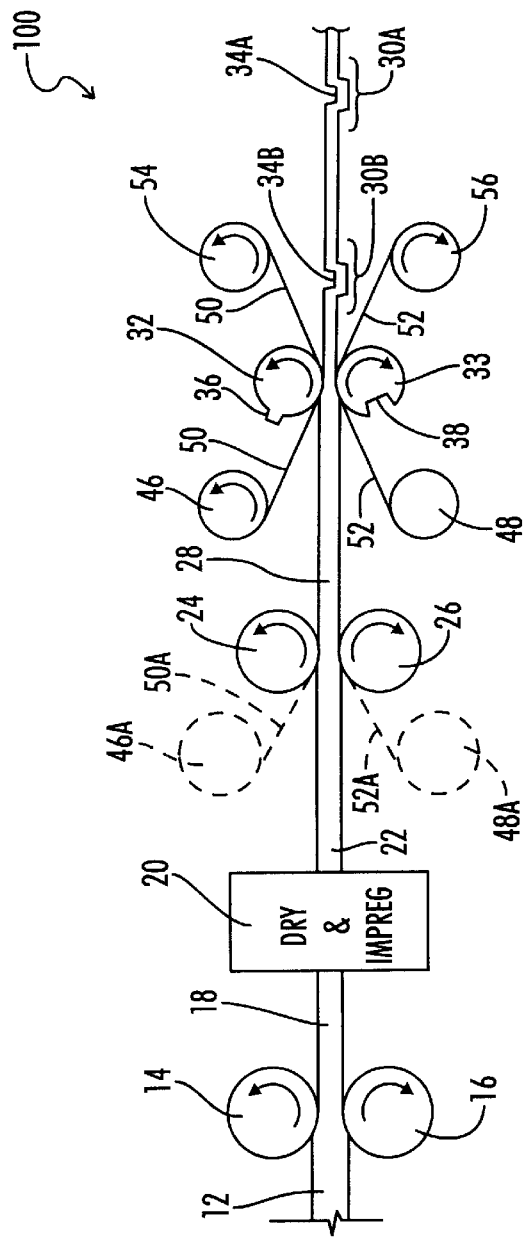
FIG. 1
FIG. 2

PROCESS TO REDUCE STICKING DURING SURFACE TREATMENT OF GRAPHITE ARTICLES

APPLICATION FOR UNITED STATES LETTERS PATENT

Be it known that I, Jeremy H. Klug, a citizen of United States, residing at Brunswick, Ohio, have invented a new and useful "PROCESS TO REDUCE STICKING DURING SURFACE TREATMENT OF GRAPHITE ARTICLES."

TECHNICAL FIELD

The present invention relates generally to processes and systems for manufacturing articles from graphite material, and more particularly to processes for reducing sticking of the graphite material to a surface treatment tool such as an embossing tool during the manufacture of the articles. The articles may be formed into components of an electrochemical fuel cell.

BACKGROUND OF THE INVENTION

An ion exchange membrane fuel cell, more specifically a proton exchange membrane (PEM) fuel cell, produces electricity through the chemical reaction of hydrogen and oxygen in the air. Within the fuel cell, electrodes denoted as anode and cathode surround a polymer electrolyte to form what is generally referred to as a membrane electrode assembly, or MEA. Oftentimes, the electrodes also function as the gas diffusion layer (or GDL) of the fuel cell. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell is advantageously formed of a membrane electrode assembly sandwiched between two graphite flow field plates. Conventionally, the membrane electrode assembly consists of random-oriented carbon fiber paper electrodes (anode and cathode) with a thin layer of a catalyst material, particularly platinum or a platinum group metal coated on isotropic carbon particles, such as lamp black, bonded to either side of a proton exchange membrane disposed between the electrodes. In operation, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which joins with the protons through the proton exchange membrane and the electrons through the circuit, and combine to form water. Since the membrane is an insulator, the electrons travel through an external circuit in which the electricity is utilized, and join with protons at the cathode. An air stream on the cathode side is one mechanism by which the water formed by combination of the hydrogen and oxygen is removed. Combinations of such fuel cells are used in a fuel cell stack to provide the desired voltage.

One limiting factor to the use of graphite materials, especially flexible graphite materials, as components for PEM fuel cells is the definition of a pattern embossed on the material, which, if not sufficient, can interfere with operation of the fuel cell, by either permitting leaking of fluids, or not permitting sufficient fluid flow through the fuel cell.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites by definition possess anisotropic structures and thus exhibit or possess many properties that are highly directional e.g. thermal and electrical conductivity and fluid diffusion.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be chemically treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been chemically or thermally expanded and more particularly expanded so as to have a final thickness or "c" direction dimension which is as much as about 80 or more times the original "c" direction dimension can be formed without the use of a binder into cohesive or integrated sheets of expanded graphite, e.g. webs, papers, strips, tapes, or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material is typically within the range of from about 0.04 g/cc to about 1.4 g/cc. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal, electrical and fluid diffusion properties of the sheet are very different, by orders of magnitude typically, for the "c" and "a" directions.

This considerable difference in properties, i.e. anisotropy, which is directionally dependent, can be disadvantageous in some applications. For example, in gasket applications where flexible graphite sheet is used as the gasket material and in use is held tightly between metal surfaces, the diffusion of fluid, e.g. gases or liquids, occurs more readily parallel to and between the major surfaces of the flexible graphite sheet. It would, in most instances, provide for greater gasket performance, if the resistance to fluid flow parallel to the major surfaces of the graphite sheet ("a" direction) were increased, even at the expense of reduced resistance to fluid diffusion flow transverse to the major faces of the graphite sheet ("c" direction). With respect to electrical properties, the resistivity of anisotropic flexible graphite sheet is high in the direction transverse to the major surfaces ("c" direction) of the flexible graphite sheet, and substantially less in the direction parallel to the major faces of the flexible graphite sheet ("a" direction). In applications such as electrodes for fuel cells, it would be of advantage if the electrical resistance transverse to the major surfaces of the flexible graphite sheet ("c" direction) were decreased, even at the expense of an increase in electrical resistivity in the direction parallel to the major faces of the flexible graphite sheet ("a" direction).

With respect to thermal properties, the thermal conductivity of a flexible graphite sheet in a direction parallel to the major surfaces of the flexible graphite sheet is relatively high, while it is relatively low in the "c" direction transverse to the major surfaces.

Flexible graphite sheet can also be provided with channels, which are preferably smooth-sided, and which pass between the parallel, opposed surfaces of the flexible graphite sheet and are separated by walls of compressed expanded graphite. When such a flexible graphite sheet functions as an electrode in an electrochemical fuel cell, it is placed so as to abut the ion exchange membrane, so that the "tops" of the walls of the flexible graphite sheet abut the ion exchange membrane.

There is a continuing need for improved processes for the manufacture of graphite articles by various forming techniques such as rotary embossing, platen press embossing and perforating, and there is a need for the prevention of the sticking of the graphite materials and particularly the resin of resin impregnated graphite materials to the forming tools.

The present invention provides such improved processes, which are particularly useful in the manufacture of materials which can be formed into components of electrochemical fuel cells.

SUMMARY OF THE INVENTION

The present invention provides a method of manufacturing articles from graphite material, the method including steps of:

(a) providing a temporary non-stick coating between a surface of the graphite material and a forming tool;

(b) engaging the surface of the article with the forming tool, with the non-stick coating therebetween, and applying pressure to the surface with the forming tool and thereby forming the article; and (c) removing the forming tool from the surface; wherein the non-stick coating disposed between the surface of the graphite material and the forming tool reduces adherence of the article to the forming tool.

In one embodiment, the temporary non-stick coating takes the form of a sprayed aerosol polymer material such as a liquid based silicone sprayed intermittently upon the forming tool. Thus, an aerosol sprayed-on layer of non-stick material is temporarily provided between the forming tool and the surface of the graphite material which is engaged by the forming tool. Preferably, a plurality of articles will be formed between the intermittent sprayings of the forming tool. An aerosol may also be used to carry a layer of solid particles, such as polytetrafluroethylene, e.g. Teflon, to coat the forming tool.

In another embodiment, the non-stick material takes the form of a flexible sheet of solid non-stick material, such as polyethylene or other polymeric material. The flexible sheet of non-stick material is sandwiched between the forming tool and the surface of the graphite material, which is engaged by the forming tool. After the article is formed, the sheet of non-stick material may be peeled away from the article.

Preferably, the forming tool takes the form of at least one of the pair of embossing rollers, and the graphite material is in the form of a sheet of graphite material being pulled through the embossing rollers. The forming tool can comprise both of the rollers, and both rollers can include forming features.

When using the sheet of solid non-stick material, it may be provided on a supply roll provided upstream of the embossing rollers, and may be retrieved with a takeoff roll downstream of the embossing rollers.

In another embodiment, the supply roll of non-stick material may be located upstream of a calendering roller so as to provide the double duty of preventing sticking of the graphite material to both one or more of the calendering rollers and the embossing roller.

Thus, an object of the present invention is the provision of methods of manufacturing graphite articles with a forming tool, and preventing sticking of the graphite material to the forming tool.

Another object of the present invention is the provision of methods for handling flexible sheets of resin impregnated graphite material during a forming process.

And another object of the present invention is the prevention of sticking of graphite material to a forming tool.

And another object of the present invention is the provision of methods for preventing adherence of resin from a resin impregnated graphite material on either a calendering roller or an embossing roller used to manufacture the sheets of graphite material and to form articles therefrom.

And another object of the present invention is the provision of economical methods of manufacturing articles from flexible sheets of graphite material.

Still another object is the provision of methods of manufacturing components of fuel cells from graphite materials.

Other and further objects, features and advantages of the present invention will be readily apparent to those skilled in the art upon a reading of the following disclosure when taken in conjunction with the accompanying drawings.

BRIEF DESCRIPTION OF THE INVENTIONS

FIG. 1 is a schematic illustration of a process line in which a flexible sheet of graphite material, which may be resin impregnated, is being formed and embossed articles are subsequently being produced therefrom. In the system of claim 1, sticking of the graphite material to the embossing rollers is reduced or prevented through the use of a sprayed-on non-stick material.

FIG. 2 is a schematic illustration of a process line similar to that of FIG. 1, but utilizing rolls of flexible sheet non-stick material, such as a polyethylene film, which are sandwiched between the sheet of graphite material and the various calendering and/or embossing rollers utilized therewith.

DETAILED DESCRIPTION OF THE PREFERRED EMBODIMENT

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than about twenty weight percent. More preferably, the graphite employed for the present invention will have a purity of at least about 94%. In the most preferred embodiment, the graphite employed will have a purity of at least about 99%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 150 pph and more typically about 50 to about 120 pph. After the flakes are intercalated, any excess solution is drained from the flakes and the flakes are water-washed. Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1, 10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_nCOOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation.

In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 250 to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.075 mm to 3.75 mm and a typical density of about 0.1 to 1.5 grams per cubic centimeter (g/cc). From about 1.5–30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, eliminates through-plane permeability while increasing handling strength, i.e. stiffness, of the flexible graphite sheet as well as "fixing" the morphology of the sheet. Suitable resin content is preferably at least about 5% by weight, more preferably about 10 to 45% by weight, and suitably up to about 60% by weight. Resins found especially useful in the practice of the present invention include acrylic-, epoxy- and phenolic-based resin systems, or mixtures thereof Suitable epoxy resin systems include those based on diglycidyl ether of bisphenol A (DGEBA) and other multifunctional resin systems; phenolic resins that can be employed include resole and novolac phenolics.

In a typical resin impregnation step, the flexible graphite sheet is passed through a vessel and impregnated with the resin system from, e.g. spray nozzles, the resin system advantageously being "pulled through the mat" by means of a vacuum chamber. The resin is thereafter preferably dried, reducing the tack of the resin and the resin-impregnated sheet, which has a starting density of about 0.1 to about 1.1 g/cc, is thereafter processed to change the void condition of the sheet. By void condition is meant the percentage of the sheet represented by voids, which are generally found in the form of entrapped air. Generally, this is accomplished by the application of pressure to the sheet (which also has the effect of densifying the sheet) so as to reduce the level of voids in the sheet, for instance in a calender mill or platen press. Advantageously, the flexible graphite sheet is densified to a density of at least about 1.3 g/cc (although the presence of resin in the system can be used to reduce the voids without requiring densification to so high a level).

The void condition can be used advantageously to control and adjust the morphology and functional characteristics of the final embossed article. For instance, thermal and electrical conductivity, permeation rate and leaching characteristics can be effected and potentially controlled by controlling the void condition (and, usually, the density) of the sheet prior to embossing. Thus, if a set of desired characteristics of the final embossed article is recognized prior to manipulation of the void condition, the void condition can be tailored to achieve those characteristics, to the extent possible.

Advantageously, especially when the final embossed article is intended for use as a component in an electrochemical fuel cell, the resin-impregnated flexible graphite sheet is manipulated so as to be relatively void-free, to optimize electrical and thermal conductivities. Generally, this is accomplished by achieving a density of at least about 1.4 g/cc, more preferably at least about 1.6 g/cc, indicating a relatively void-free condition.

The calendered flexible graphite sheet is then passed through an embossing apparatus as described hereinbelow, and thereafter heated in an oven to cure the resin. Depending on the nature of the resin system employed, and especially the solvent type and level employed (which is advantageously tailored to the specific resin system, as would be familiar to the skilled artisan), a vaporization drying step may be included prior to the embossing step. In this drying step, the resin impregnated flexible graphite sheet is exposed to heat to vaporize and thereby remove some or all of the solvent, without effecting cure of the resin system. In this way, blistering during the curing step, which can be caused by vaporization of solvent trapped within the sheet by the densification of the sheet during surface shaping, is avoided. The degree and time of heating will vary with the nature and amount of solvent, and is preferably at a temperature of at least about 65° C. and more preferably from about 80° C. to about 95° C. for about 3 to about 20 minutes for this purpose.

One embodiment of an apparatus for continuously forming resin-impregnated and calendered flexible graphite sheet is shown in International Publication No. WO 00/64808 the disclosure of which is incorporated herein by reference.

Referring now to the drawings, FIG. 1 is a schematic illustration of a system 10 for manufacturing articles from a flexible sheet of graphite material. In the system 10, the graphite material is manufactured and subsequently formed into articles in a continuous process that moves from left to right. At the left hand end of the process, a flexible sheet of graphite mat 12 is pulled between a pair of pre-calendering rollers 14 and 16, and exits as a pre-calendered mat 18 which then moves through an impregnation and drying station 20 within which the mat is impregnated with the desired resin content. Then the impregnated mat 22 moves through at least one pair of calendering rollers 24 and 26 to form a flexible sheet 28 of resin impregnated graphite material of the type and characteristics generally described above.

The flexible sheet of resin impregnated graphite material 28 is subsequently formed into a plurality of articles such as 30A and 30B in a continuous manufacturing process wherein the flexible sheet 28 of resin impregnated graphite material is pulled between a pair of forming rollers 32 and 33 to emboss surface features such as 34A and 34B upon the articles 30A and 30B in a continuous process.

After the embossing of the articles 30A and 30B in the sheet 28, the articles will be cut from the sheet 28.

The embossing rollers 32 and 33 may be designed to emboss intricate patterns of features upon the articles 30A and 30B. Embossing roller 32 is schematically indicated as having a complex shape 36 defined on the surface thereof for creating the embossed feature, such as 34A and 34B in the sheet 28 of resin impregnated graphite material. The complementary embossing roller 33 may in some cases have an uninterrupted cylindrical outer surface, or as in the embodiment shown in FIG. 1, it may have complementary negative surface features 38 which will interact with the complex surface features 36 of roller 32 to aid in forming the features such as 34A and 34B on the articles 30A and 30B. Examples of the types of articles which may be manufactured by such an embossing process include materials useful in the formation of components of a fuel cell, such as flow field plates, electrodes and gas diffusion layers.

In order to achieve good part definition of the features 34 upon the articles 30, and to achieve negligible void volume in the articles 30, a substantial roller force must be applied between the embossing roller 32 and the sheet of graphite material 28 in order to move and reposition the material of which the sheet 28 is made. Particularly, the resin content of the sheet 28 must be caused to flow and move during this process. This large force, however, provides intimate contact between the sheet of material 28 and the embossing roller 32 which may lead to an adhesion force between the material and the embossing roller 32, and particularly between the resin of the material 28 and the embossing roller 32, which is greater than the peel strength of the embossed articles 30 from the tool 32. Particularly, this is a problem when the sheet 28 is a resin impregnated sheet, and the resin component of the sheet 28 tends to stick to the rollers 32 and 33. Thus, in the absence of the techniques provided by the present invention, the flexible sheet of material 28 may stick to the embossing rollers 32 and 33. This not only ruins the formed articles 30, but causes lengthy process shutdowns to remove and clean the embossing rollers 32 and 33.

FIG. 1 illustrates schematically a first process for reducing this problem of materials sticking to the embossing rollers 32 and 33. In the process of FIG. 1, spray nozzles 40 and 42 are provided adjacent embossing rollers 32 and 33. Intermittently, a liquid non-stick material 44 is sprayed upon the surface of the rollers 32 and 33. This sprayed on liquid non-stick material provides a layer of non-stick material between the rollers and the sheet 28 of resin impregnated graphite material. The spray material 44 has the ability to last for several embossing cycles so that application is not needed for each of the embossed parts 30. Instead, a plurality of embossed parts, such as 30A and 30B, may be formed between the intermittent periods of spraying material 44 upon the embossing rollers.

It is noted that an aerosol may also be used to spray a layer of solid particles, such as polytetrafluroethylene, e.g. Teflon, onto the rollers 32 and 33.

Also, liquid coatings of silicone or the like could be brushed on, or applied by any other suitable means.

The timing and amount of material sprayed upon the embossing rollers is selected so as to provide the desired non-stick function, while minimizing the amount of spray non-stick material 44 utilized so as to minimize subsequent effort in cleaning the finished parts 30.

Any suitable spray on non-stick material 44 can be utilized. One example of a suitable material is an aerosol-based silicone releasing spray material sold under the brand Frekote® EXITT, available from The Dexter Corporation, One Dexter Drive, Seabrook, N.H. 03874

FIG. 2 schematically illustrates a second process 100 for reducing the problem of sticking of the sheet 28 of resin impregnated graphite material to the embossing rollers 32 and 33.

In the embodiment of FIG. 2, first and second supply rolls 46 and 48 are located upstream of the embossing rollers 32 and 33, respectively. Each of the supply roll 46 and 48 carries a roll of very thin flexible solid non-stick material 50 and 52, respectively. The non-stick material 50 and 52 is pulled from the rolls 46 and 48 along with the sheet 28 of resin impregnated graphite material, and the non-stick material 50 and 52 is sandwiched on either side of the graphite material 28 between the graphite material 28 and either of the rollers 32 and 33, respectively, to prevent sticking of the graphite material 28 to the embossing rollers 32 or 33.

Then as the sandwiched materials exit from the embossing rollers 32 and 33, the thin sheets 50 and 52 are peeled from the graphite material and taken up on take-off rolls 54 and 56, respectively, located downstream of the embossing rollers 32 and 33.

The non-stick film 50 and 52 is preferably a non-stick polymeric material such as polyethylene. The non-stick material 50 and 52 must have certain mechanical performance characteristics. The key mechanical attributes of this film material 50 and 52 are its modulus and failure strain. The film 50 and 52 must possess a sufficiently low modulus so that it stretches during the embossing process, and it must also have a strain-at-failure value that will allow for stretching or contouring to the contours of the complex embossing surfaces 36 and 38 so as to form the features 34 in the articles 30. In other words, the film must stretch without tearing. The required strain-at-failure value is entirely dependent upon the size and geometry of the features 34 which must be formed in the particular article 30.

One example of material that has been found suitable is 0.5 mil thickness polyethylene material. This material is commercially available under the brandname GLAD® Clingwrap. In general, utilizing polyethylene material, the film thickness should be in the range of from about 0.1 mil to about 2.0 mil, and more preferably in the range of from about 0.25 mil to about 1.0 mil.

It is also noted that the non-stick film 50 and 52 may be introduced to the process upstream of calendering rollers 24 and 26 so that the same sheet of film can be utilized to prevent sticking of the graphite material to both the calendering rollers 24 and 26 and to the embossing rollers 32 and 33. This is schematically illustrated in FIG. 2 in dashed lines wherein alternative positions 46A and 48A are shown for the supply rolls carrying the non-stick film.

The use of the system 100 shown in FIG. 2 provides certain advantages over the system 10 of FIG. 1 in that no chemicals are transferred to the embossing rollers 32 and 33 or to the finished articles 30, and there are no time dependent, roller surface quality issues such as the need for monitoring the time between intermittent sprays of sprayed-on material like it is required in the system 10 of FIG. 1. In addition, the use of the solid sheets of non-stick material 50 and 52 allows for a much more flowable resin system to be used in the resin impregnated graphite material 28, thus allowing more complex articles 30 to be manufactured by the rotary embossing technique.

Implementation of either of the non-stick processes 10 or 100 of FIG. 1 or 2, offers the possibility of lower equipment cost and higher production capacity. Lower equipment costs come from the fact that the embossing rollers 32 and 33 may be standard aluminum rollers versus Teflon® coated or chrome plated rollers which might otherwise be needed to reduce sticking of material to the rollers. Additionally, labor costs are reduced due to the reduction or elimination of the need to clean the embossing rollers 32 and 33 and/or the calendering rollers 24 and 26. Additionally, a higher production capacity is provided for either of the process lines 10 or 100.

Also, incorporation of the film upstream of the calendering rollers 24 and 26 as shown in dashed lines in FIG. 2 will prevent resin build up on the calendering rollers 24 and 36 thus further reducing scrap, increasing production, and reducing the necessary maintenance and cleaning efforts.

Although the methods of reducing sticking have been disclosed herein primarily in the context of embossing rollers, it will be understood that these techniques are generally applicable to many other standard manufacturing processes for forming articles from graphite materials. These include platen press embossing, perforating, indenting, die pressing, isostatic molding, and other like processes.

The methods of manufacturing articles 30 from the sheet 28 of graphite material, of either systems 10 or 100 of FIG. 1 or 2, can be described as generally including the steps of:

(a) Providing a temporary non-stick coating such as the spray material 44 in FIG. 1, or the solid non-stick films 50 and 52 in FIG. 2, between a surface of the graphite material 28 and a forming tool, such as embossing rollers 32 and 33.

(b) Upper and lower surfaces 27 and 29 of the sheet 28 of graphite material are engaged by the embossing rollers 32 and 33, which may be generally referred to as forming tools, with the non-stick coating, therebetween. Pressure is applied to the surfaces 27 and 29 by the embossing rollers 30 and 33 to form the features 34 in the articles 30.

(c) As the sheet 28 moves past the embossing rollers 32 and 33, the surfaces of the embossing rollers move out of engagement with the sheet 28 which can be generally described as removing the forming tools 32 and 33 from the surfaces 27 and 29 of the graphite material 28.

(d) During the step (c), adherence of the graphite material 28 in general and the articles 30 specifically to the forming tools 30 and 32 is reduced and preferably completely prevented by means of the non-stick coating.

Thus, it is seen that the methods and apparatus of the present invention readily achieve the ends and advantages mentioned as well as those inherent therein. While certain preferred embodiments of the invention have been illustrated and described for purposes of the present disclosure, numerous changes in the arrangement and construction of components and steps may be made by those skilled in the art, which changes are encompassed within the scope and spirit of the present invention as defined by the appended claims.

What is claimed is:

1. A method of manufacturing articles from graphite material, said method comprising the steps of:

(a) providing a temporary non-stick coating between a surface of the graphite material and a forming tool;

(b) engaging the surface of the graphite material with the forming tool, with the non-stick coating therebetween, and applying pressure to the surface with the forming tool thereby forming the article; and (c) removing the forming tool from the surface, wherein the non-stick coating disposed between the surface of the graphite material and the forming tool reduces adherence of the article to the forming tool.

2. The method of claim 1, wherein:

step (a) includes applying a non-stick liquid onto the forming tool.

3. The method of claim 2, wherein:

the non-stick liquid is a silicone base spray, and step (a) includes spraying the silicone based spray via an aerosol.

4. The method of claim 2, wherein:

step (a) includes intermittently applying the non-stick liquid onto the forming tool; and the method further comprises manufacturing a plurality of such articles with the forming tool between the intermittent applications of step (a).

5. The method of claim 2, wherein:

in step (a) the forming tool is an embossing roller.

6. The method of claim 1, wherein:

step (a) includes sandwiching a flexible sheet of solid non-stick material between the forming tool and the surface of the article.

7. The method of claim 6, wherein:

the non-stick material is a polymeric material.

8. The method of claim 7, wherein:

the polymeric material has a thickness in the range of from about 0.1 mil to about 2.0 mil.

9. The method of claim 8, wherein:

the polymeric material has a thickness in the range of from about 0.25 mil to about 1.0 mil.

10. The method of claim 7, wherein:

the polymeric material is a polyethylene material.

11. The method of claim 6, further comprising:

during step (b), stretching the flexible sheet of solid non-stick material to conform to contours of the forming tool.

12. The method of claim 6, wherein:

in step (a), the forming tool includes an embossing roller and the graphite material is a flexible sheet of graphite material, and said step (a) includes unrolling the sheet of solid non-stick material and pulling the sheet of solid non-stick material and the sheet of graphite material past the embossing roller.

13. The method of claim 12, further comprising:

peeling the sheet of non-stick material away from the sheet of graphite material after the sheet of graphite material has been formed by the embossing roller.

14. The method of claim 12, further comprising:

prior to step (b), pulling a mat of graphite material between a pair of calendering rollers to manufacture the flexible sheet of graphite material; and placing the sheet of solid non-stick material between the mat of graphite material and at least one of the calendering rollers.

15. The method of claim 14, further comprising:

providing a second sheet of non-stick material between the mat of graphite material and the other of the calendering rollers.

16. The method of claim 1, wherein:

the graphite material is a resin-impregnated graphite material; and step (d) includes reducing adherence of the resin to the forming tool.

17. The method of claim 1, wherein:

step (a) includes spraying a non-stick aerosol onto the forming tool.

* * * * *